Figure 1:
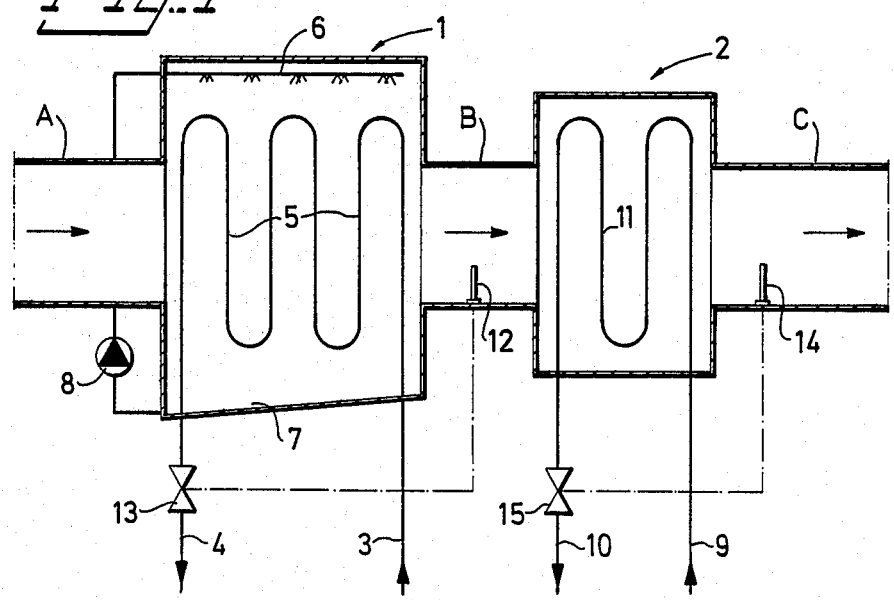

United States Patent [19]

Weitman

[11] Patent Number: 4,574,062
[45] Date of Patent: Mar. 4, 1986

[54] APPARATUS FOR TREATING CONTAMINATED GAS

[76] Inventor: Jacob Weitman, Tryffelvagen 8, S-611 63 Nykoping, Sweden

[21] Appl. No.: 619,707
[22] PCT Filed: Sep. 11, 1981
[86] PCT No.: PCT/SE81/00254
§ 371 Date: May 12, 1982
§ 102(e) Date: May 12, 1982
[87] PCT Pub. No.: WO82/00960
PCT Pub. Date: Apr. 1, 1982

Related U.S. Application Data

[63] Continuation of Ser. No. 380,744, May 12, 1984, abandoned.

[30] Foreign Application Priority Data

Sep. 12, 1980 [SE] Sweden .............................. 8006388

[51] Int. Cl.⁴ ...................... B01D 47/06; B01D 47/12
[52] U.S. Cl. .................................... 261/147; 261/130; 261/131; 165/3; 165/60; 165/125; 55/20; 55/90; 55/222
[58] Field of Search .................... 55/20, 90, 222, 228, 55/241, 242, 257 HE, 269; 261/3, 129–131, 152, 153, DIG. 34, 23 R, 146, 147; 62/90, 173; 165/3, 59, 60, 125, 145, DIG. 8

[56] References Cited

U.S. PATENT DOCUMENTS

| | | | |
|---|---|---|---|
| 1,837,798 | 12/1931 | Shipley | 261/DIG. 34 |
| 2,018,780 | 10/1935 | Folsom | 261/DIG. 34 |
| 2,076,119 | 4/1937 | Carraway | 261/153 |
| 2,142,423 | 1/1939 | Timmis | 261/129 |
| 2,992,545 | 7/1961 | Walker | 165/DIG. 8 |
| 3,672,126 | 6/1972 | Goettle | 55/222 |
| 3,939,881 | 2/1976 | Scott | 55/228 |
| 3,963,461 | 6/1976 | Stockford et al. | 261/130 |
| 4,054,980 | 10/1977 | Roma | 165/DIG. 8 |
| 4,235,281 | 11/1980 | Fitch et al. | 165/DIG. 8 |
| 4,252,752 | 2/1981 | Flandroy | 261/153 |
| 4,327,801 | 5/1982 | Koizumi et al. | 165/125 |
| 4,367,787 | 1/1983 | Bradshaw | 165/59 |

FOREIGN PATENT DOCUMENTS

| | | | |
|---|---|---|---|
| 853295 | 8/1952 | Fed. Rep. of Germany | 261/23 R |
| 2248845 | 4/1974 | Fed. Rep. of Germany | 165/125 |
| 593093 | 11/1977 | Switzerland | 55/222 |
| 2017895 | 10/1979 | United Kingdom | 165/DIG. 8 |
| 197709 | 9/1977 | U.S.S.R. | 261/153 |

Primary Examiner—David L. Lacey
Attorney, Agent, or Firm—Lewis H. Eslinger

[57] ABSTRACT

Contaminated air is treated to attain a predetermined temperature, purity and relative humidity using an apparatus which includes heat exchange elements and water spray nozzles. The heat exchange elements comprise tubes arranged to impart turbulence to the contaminated air flowing over the tubes. Water is sprayed into the air flow against the tubes and water droplets intimately mix with the air flow so that the contact surfaces of the tubes simultaneously perform three functions: purification of the air, humidification of the air to a relative humidity of about 100%, and bringing the air to a desired temperature. Purification occurs when the air-water droplets hit the outside contact surfaces of the tubes. Impurities contained in the air are deposited on the contact surfaces to be washed away by the water spray. Humidification occurs when the spray water on the contact surfaces is vaporized by the addition of heat from a heat transport fluid conducted through the tubes. The treated air can be heated to its desired final temperature and relative humidity in a separate heater downstream of the apparatus.

2 Claims, 3 Drawing Figures

APPARATUS FOR TREATING CONTAMINATED GAS

This is a continuation of application Ser. No. 380,744, filed May 12, 1984 now abandoned.

The present invention relates to treating a contaminated gas, in particular a gas at elevated temperature and in most applications air, to purify the gas and give it properties to make it reusable. In particular, the invention relates to the treatment of air to give it a selected degree of purity, a predetermined temperature and a predetermined relative humidity, simultaneously making possible a diminution of the heat consumption required to make the air suitable for use in heating a living space.

Within many industries, there is a demand for processing air as well as for inlet air to industrial buildings having accurately selected temperature and relative humidity. The air, at least as far as it is to be used as inlet air for heating living space, is subject to exacting standards of purity. As typical examples of such industries where high relative humidity is a must there are the textile industry, weaving industry, and paper industry, because in such industries dry air creates severe problems of static electricity. As a byproduct of such industries, large flows of air of elevated temperature are produced, which air may be more or less contaminated. Theoretically, it would seem desirable at least during winter to utilize the heat content of such air by purifying and reconditioning it, with respect to its temperature and relative humidity, and then recirculating it to the living spaces or for reuse in the industrial process that created it.

It is known in the prior art to scantily purify such heated and contaminated air, that is, to purify it only so far is required to avoid environmental problems, and then to expel the air into the surrounding atmosphere. To satisfy the demand for inlet air for heating, it has been common practice to use large quantities of fresh air from the surrounding atmosphere. But, at least during winter, large amounts of energy must be added to fresh air for the required net temperature increase and for vaporization of the quantities of water required to increase the very low moisture content of the air.

It is an object of the present invention to substantially eliminate such problems by simultaneously providing for a purification of, a heat recovery from and a recirculation of heated outlet air in such a manner that the outlet air alone or admixed with a quantity of fresh air, treated in the same manner, attains a desired purity, temperature and relative humidity.

Said object is attained according to the invention by executing a method or using an apparatus as defined by the accompanying claims.

The invention will be more closely described with a reference to the accompanying drawings, in which FIG. 1 schematically illustrates an apparatus for carrying out the method according to the invention.

Figure 2:
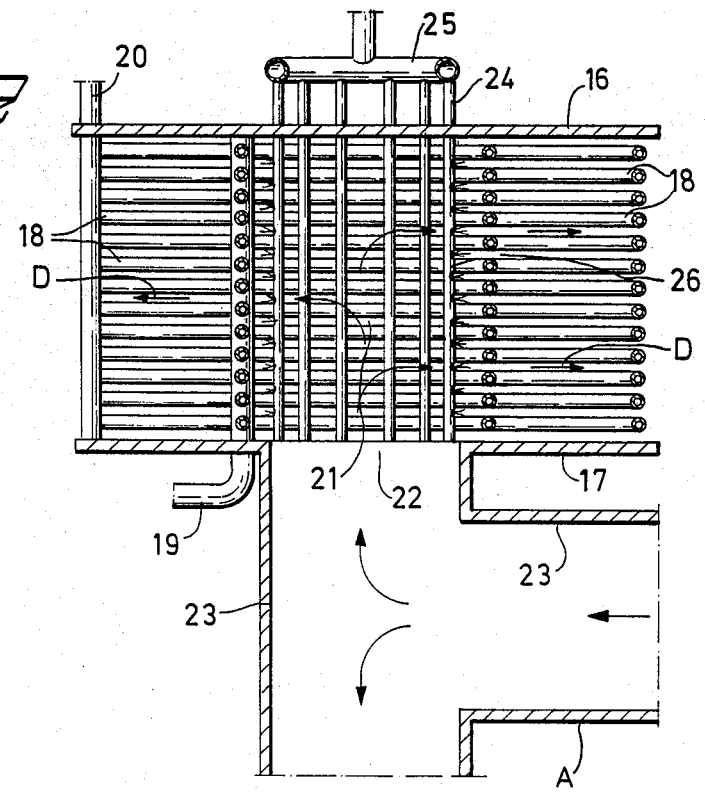
Figure 3:
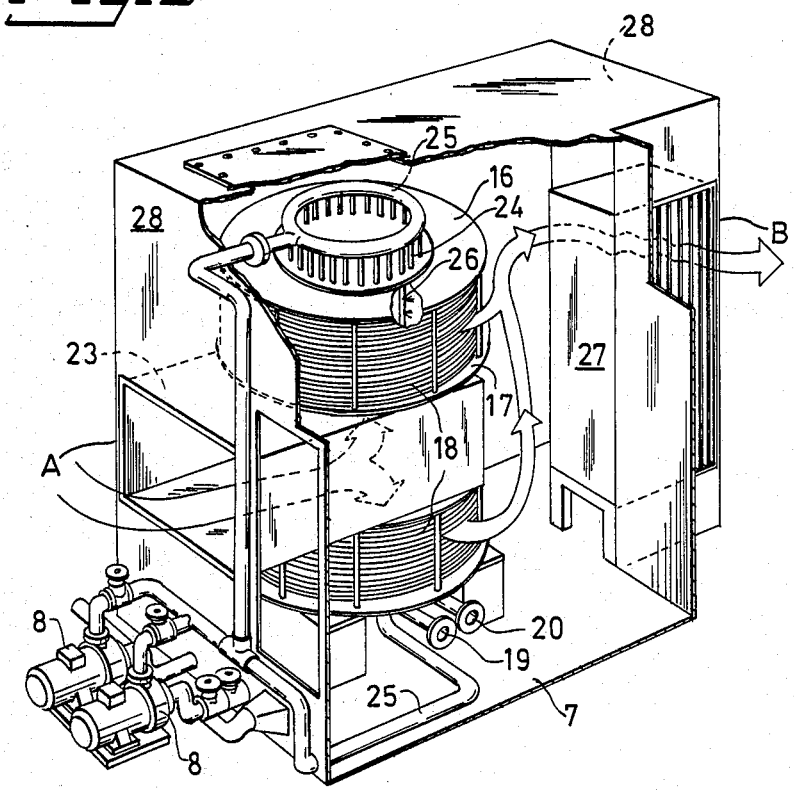

FIG. 2 is a simplified cross-section of an embodiment of the first stage of an apparatus laid out as illustrated by FIG. 1, and FIG. 3 illustrates in additional detail the apparatus shown in FIG. 2.

The invention enables saving large energy quantities by cleaning, climatizing and recirculating outlet air from different kinds of processes. Energy savings can be provided by means of a direct heat recovery from the warm outlet air and due to the fact that the process air, at least in part, is recirculated. The heat content of the process air is used as a substitute for the heat bound by the vaporization of such quantities of water which are necessary for increasing the relative humidity of the air to a desired value.

According to the invention the process air, possibly admixed with fresh air from outside, is conducted through a flow duct enclosing a number of contact or deposition surfaces, onto which are deposited and collected such impurities as have been carried by the gas or have been dissolved therein or admixed therewith. In a preferred embodiment of the invention, the gas is conducted in such a manner that the contact between the gas and said contact surfaces will be intimate, and, further, in such a manner that the gas repeatedly is forced to change flow direction, so that particles, droplets of liquid or similar items carried by the gas, due to their relatively high density, hit the surfaces. According to the invention the purification of the gas is provided for by means of wet-scrubbing, in which the liquid, in most applications water, is ejected into the gas, preferably in countercurrent thereto, and, as the case may be, onto portions of said contact surfaces. To enhance the efficiency of the scrubbing, the scrubbing liquid may contain substances without properties detrimental to the environment, tensides, e.g., which provide for an emulgation of the air impurities in the scrubbing liquid. To provide for the purification of the gas for extended periods of time, a substantially continuous cleaning of the contact surfaces is an object of the invention. Accordingly, cleaning is effected by using liquid injected into the gas and onto the contact surfaces to continuously flush away the impurities as they are separated from the gas. Advantageously, a surplus of scrubbing liquid may be used for this purpose. After having being used for wet-scrubbing and for the removal of separated impurities, the liquid is collected, and a concentrate of impurities together with a portion of the scrubbing liquid is separated and replaced by a corresponding quantity of pure liquid. This surplus of scrubbing liquid has a function to be described in more detail below.

The invention aims not only at purification of a gas flow that it can be recirculated and used for heating a living space, but also an adaption of the temperature and relative humidity of the gas to values required for an industrial process. It is made possible by injecting a surplus of water over contact surfaces of a heat exchanger and by transferring heat to or from the gas via said contact surfaces to create a gas flow saturated with humidity and accurately heated to a predetermined temperature level. By later adding heat, such gas flow may then by simple means be brought to predetermined values of relative humidity and temperature. Such heating of the gas flow is, in a preferred embodiment of the invention, provided for in a separate heater stage, but may as well be provided for by injecting the saturated air into the space to be heated where the heating is then provided by surplus heat from equipment, machines or the like present in the locality.

When moistening the air into a saturated state, very large quantities of vaporized water are necessary, during winter-time in particular, if fresh air is introduced from the surrounding atmosphere. Such large quantities of water bind large quantities of energy, which energy is, according to the invention, in the first instance taken from the contaminated gas being treated according to the invention.

To improve the heat transfer to or from the gas at the contact surfaces as far as possible, a heat transporting fluid is conducted along one side of said surfaces, while the gas or air is conducted along the other side thereof. Preferably, the flow directions are selected according to the counter-current principle, combined, if desired, with the crosswise flow principle, which makes possible maximum temperature changes relative to the contact surface. The heat transfer between the gas and the heat transporting fluid passing through the contact surface is further enhanced by wetting the other side of said surface with a film-like coating of scrubbing liquid. The heat transfer between the gas and the contact surface may also be enhanced by using a high velocity of and turbulence in the gas flow, which turbulence is also advantageous with respect to the efficiency of the separation of gas impurities.

A comparatively large contact surface which is inert relative to the treated gases and scrubbing liquid is necessary to obtain the maximum efficiency of the scrubbing. When the contact surface is made from a material having excellent heat conducting properties, copper for instance, the contact surface will be too large relative to the heat transfer capacity if the contact surface has a sufficient size to be efficient as regards the purification function. For an economic point of view, it would hardly be desirable to use a contact surface of an expensive metal material with sufficient size to obtain the intended purification. Therefore, a sufficiently large and inert contact surface is obtained by using a plastic material, as will be explained in more detail below.

FIGS. 1–3 illustrate an apparatus for executing the method according to the invention. FIG. 1 shows that the apparatus comprises a first stage 1 and a second stage 2. The first stage constitutes an apparatus acting as a combined heat exchanger and scrubber which provides a purified air flow saturated by humidity and having a predetermined temperature at its outlet. Stage 1 has an air inlet A, an air outlet B, an inlet 3 for the supply of heat transporting fluid and an outlet 4 for said fluid. The inlet and outlet for the heat transporting fluid are connected to contact surfaces 5 constituting of tubular elements through which the heat transporting fluid flows from the inlet 3 to the outlet 4, that is, in counter-current to the air flow from the air inlet to the air outlet of stage 1. It is also advantageous to arrange the tube system such that the flow is in accordance with the crosswise current principle. Further, stage 1 comprises injection means 6 for injecting a finely distributed scrubbing liquid, said liquid in a majority of applications being a water spray. The injection means 6 is arranged so as to inject the liquid into the air flow proper, preferably against the direction thereof, as well as onto the surfaces 5 to apply thereto a film-like coating of liquid. Stage 1 further comprises a tray 7 for collecting surplus liquid. The liquid collected in the tray 7 is fed back to the injection means 6 by a pump 8. Part of the quantity of liquid is removed and a corresponding quantity of pure liquid added to provide for recirculation of substantially the same volume of liquid.

The contact surfaces 5 of stage 1 serve two different aims. First, the surfaces 5 constitute heat exchange surfaces to transfer heat to or from air entering at inlet A. This heat is transferred through surfaces 5 between the air and a heat transporting fluid flowing from inlet 3 to outlet 4. Secondly, the surfaces 5 provide surfaces that bring into contact injected liquid and the air flow, thus enhancing the vaporization of the injected water while binding the impurities entering with the air. Preferably, the surfaces 5 are arranged in such a manner relative to each other that they give rise to repeated changes of direction in the flowing air.

Due to the fact that the invention is mainly, although not exclusively, related to the treatment of such contaminated air of elevated temperature which, at least together with water, may be corrosive and which shall be purified from contaminations to such a degree that it can be re-used as inlet air for heating living spaces, certain conditions will have to be satisfied by stage 1 of the apparatus. The requirement of purification (i.e. scrubbing) implies that there are large contact surfaces between the air and injected liquid. This is also in agreement with the conditions for a favorable heat exchange and a satisfactory vaporization of injected water. However, corrosion resistant materials are so expensive that a sufficiently large surface is hardly attainable by using conventional materials. Therefore, according to the invention, corrosion resistivity is provided by manufacturing the heat exchanger and contact surfaces 5 from an artificial resin material. The use of such a material may seem remarkable in this connection, since most plastic materials have poor heat conductivity and thus impair the efficiency of the heat exchange. However, such plastic materials are comparatively cheap and have satisfactory corrosion resistance and at low cost can be made so large that, in spite of their poor heat conducting capacity, the efficiency of the heat exchange is maintained at a sufficiently high level. Also favorable for attaining a high efficiency is the fact that the surfaces when made of such material operate in a wetted state.

Outlet B of stage 1 also constitutes an inlet to the second stage of the apparatus, constituting a heat exchanger 2 which has an outlet C. Stage 2 includes an inlet 9 for a heat transporting fluid in order to heat the surfaces 11, which fluid leaves the heat exchanging surfaces 11 through an outlet 10. The heat exchanging surfaces 11 are arranged according to the counter-current principle.

The apparatus may further comprise a droplet separator, not shown in FIG. 1, which may either be arranged within the combined scrubber and heat exchanger stage 1 or as a separate unit between stages 1 and 2 in the connection therebetween at outlet B.

In accordance with the invention this is provided for as follows. In the first stage 1 of the apparatus, water is injected by spraying via the injection means 6 in such a quantity and in finely distributed state that the relative humidity of the air increases to a value substantially reaching 100% at outlet B. Due to the vaporization of the water, a certain quantity of energy will then have been absorbed. As a result, at outlet B the air is saturated by humidity and has a lower temperature than would be the case at outlet A, although the abosrbed energy is partly substituted via the contact surfaces 5. If no further water is present in the form of minute water droplets, the quantity of water contained in a specific volume of air is determined by the temperature of the air. To change the values as to relative humidity and temperature from the values prevailing at outlet B to the intended final values at outlet C, the temperature is increased to a desired level by the heat supplied by the heat exchanger stage 2. The maximum quantity of water contained in a specific volume of air in the form of vapor being dependent on the temperature (i.e., increasing with the temperature), the relative humidity of the air will decrease to a value at outlet C less than 100% when the temperature is increased. The magnitude of the decrease of the relative humidity will be dependent on the absolute moisture content of the air, this in its turn being dependent of the temperature prevailing at outlet B. This means that, after the temperature at outlet C is determined, the relative humidity at this outlet C may easily be controlled by controlling the air temperature at outlet B. To provide for such control of the temperature at outlet B, a temperature sensor 12 is disposed there, which temperature sensor 12 controls a control valve 13, which is, preferably, arranged in the fluid outlet 4 of stage 1. Obviously, a certain amount of control of the temeprature may also be provided by controlling the temperature of the entering air flow, that is, by varying the proportion of cold air admixed from the outside, for instance, with the warm process air. Finally, the air temperature at outlet C is controlled in a similar manner by sensing the temperature by means of a sensor 14 arranged in the outlet, outlet C, of the apparatus which controls a control valve 15 in the heat transporting fluid duct of stage 2.

In such operating situations when the air at inlet A has a comparatively high temperature, the temperature control at outlet B provides for heat transport from the surfaces 5 by means of the heat transporting fluid entering at 3 and leaving at 4, that is, the heat transporting fluid is heated by the air if the cooling due to the vaporization of the injected water is not sufficient for decreasing the air temperature. In other conditions of operation, in which air entering at inlet A has a lower temperature or is drier (for example, operation during wintertime) heat is instead added to the air flow.

FIG. 2 shows a cross-section of an embodiment of the combined purification and climatization apparatus, that is, stage 1 in FIG. 1. The apparatus is built up about an upper and a lower plate 16 and 17, respectively, which are secured relative to each other by means not shown in FIG. 2 which, for instance, comprise the vertical posts arranged along the peripheries of the plates 16 and 17 shown in FIG. 3. Between the plates a number of tube coils 18 are arranged, the inner ends of which are connected to an outlet 19 and the outer ends of which are connected to an inlet 20, thereby providing for a counter-current action as well as a crosswise-current action relative to the flow of air to be purified and provided with the selected climate parameters. The coils 18 are arranged in such a manner that a vertical channel 21 is provided centrally of the apparatus, said channel in practice having a diameter on the order of 1 meter, for instance. Said channal 21 opens downwardly, the plate 17 having a corresponding aperture 22, connecting to an air supply duct 23 comprising the inlet A. From inlet A air flows through the aperture 22 into the channel 21 and further radially outwardly through the passages D formed between adjacent ones of coils 18 to the periphery of coils 18 where the air leaves the apparatus.

At the periphery of the central channel 21 a number of vertical tubes 24 are arranged, which tubes are, on top of the plate 16, connected to an inlet header 25 for introducing scrubbing fluid, usually water, under pressure. In an embodiment of the size referred to above, the vertical tubes 24 may be arranged at a mutual distance of about 10 cm in the peripheral direction, the tubes on their surfaces facing the coils being provided with a number of nozzles 26 to eject jets of finely dispersed water toward the coils 18 and into the passages D within which the air flows radially outwardly. Water is added in such a quantity that the coils 18 are covered by film-like layers of water and, in addition thereto, the air is intimately admixed with the finely dispersed water ejected through the nozzles 26. The water is thus expelled over the periphery of the device together with the impurities separated from the air and is thereafter collected to be purified and recirculated. A surplus of water may be used to effectively wash the coils 18 and thus keep the coils free from the precipitated contaminants.

As an alternative to the vertical tubes 24 as described, the channel 21 may comprise a centrally arranged tube provided with a number of nozzles for ejecting finely dispersed water. Said nozzles are then preferably directed against the air flow from the air supply duct 23 as well as against the coils 18. Preferably, the nozzles are of the self-rinsing spiral type.

Instead of being shaped in the manner illustrated by FIG. 2 the coils 18 may also be shaped in a plurality of alternative manners. So for instance, the coils, instead of being arranged as flat spirals, may be conical- or screw-shaped, the different windings of the coils being arranged relative to each other in such a manner that the flow in the radially outwardly direction through passages D between coils 18 will be "wave-shaped" or "zigzag-shaped" that is, repeatedly change direction. Further, the nozzle 26 instead of being arranged in the manner described above, may be located along a coil within the central channel 21. Further the economic advantage in providing a sufficiently large surface of the coils 18 by producing them from a plastic material is emphasized.

FIG. 3 shows an example of a construction of the combined contamination separator and climatization apparatus, that is, stage 1 in FIG. 1, as applied in practice. Above and below an air admission channel 23 an upper and a lower group of tube coils 18 are arranged, the upper group corresponding to the device illustrated by FIG. 2. FIG. 3 shows that the upper as well as the lower group of tube coils 18 are arranged between upper and lower plates 16 and 17, respectively, and are in connection with an outlet 19 and an inlet 20 for heat transporting fluid. Water under pressure is introduced by pumps 8 to the inlet tube 25 and therefrom via vertical tubes 24 to nozzles 26 within the central channel 21. The air introduced at A leaves along the peripheries of the coils 18 passing therefrom through a droplet separator 27 to the outlet B. Preferably the apparatus as well as the droplet separator are enclosed by a cover 28, the lower part of which acts as collecting tray 7 for surplus water as shown schematically in FIG. 1. As mentioned above with reference to FIG. 2, the greater part of the water ejected through the nozzles 26 leaves at the periphery of the coils, there containing the precipitated impurities washed from the coils. However, part of the finely dispersed water, if injected in large surplus, might be carried on by the air flow, due to the fact that said flow has a relatively high flow velocity. In the embodiment according to FIG. 3 the two heat exchanger-scrubber units are enclosed in a cover presenting a large flow cross-section for the air, the flow velocity thus being substantially diminished to allow for a settling of the water particles carried by the air toward the bottom of the cover to the collecting tray 7. Very small particles which have not yet been precipitated when leaving the cover 28 will be separated out in the droplet separator 27, so that the air leaving the apparatus through outlet B is substantially saturated with humidity but is free from water in the liquid state.

The invention may be modified within the scope of the appended claims.

I claim:

1. An apparatus for treating air contaminated with impurities by scrubbing, humidifying and tempering the air to provide air having a predetermined degree of purity, a relative humidity of substantially 100% and a predetermined temperature, the apparatus comprising an inlet for contaminated air, an outlet for purified air and a flow path therebetween; injection means for injecting a spray of liquid into said flow path; and heat exchanger means in said flow path for providing contact surfaces having one side in contact with said spray and said air and another side in contact with a heat transporting fluid, wherein:

said flow path extends from said inlet to said outlet radially outwardly through said heat exchanger means for directing air along said flow path;

said heat exchanger means comprises first and second pluralities of axially stacked layers of coils of tubular elements, said pluralities being axially spaced from one another, each said layer including radially inner and outer coils interconnected for the passage of said heat transporting fluid through said tubular elements from a coil inlet means connected to said outer coils to a coil outlet means connected to said inner coils;

said injecting means comprises first and second pluralities of injection nozzles disposed radially inwardly of said first and second pluralities of coils, respectively, for directing said spray thereagainst; and said inlet includes first and second inlet ducts positioned and arranged for directing contaminated air across said first and second pluralities of coils generally radially outwardly thereof.

2. An apparatus for treating air contaminated with impurities by scrubbing, humidifying and tempering the air to provide air having a predetermined degree of purity, a relative humidity of substantially 100% and a predetermined temperature, the apparatus comprising an inlet for contaminated air, an outlet for purified air and a flow path therebetween; injection means for injecting a spray of liquid into said flow path; and heat exchanger means in said flow path for providing contact surfaces having one side in contact with said spray and said air and another side in contact with a heat transporting fluid, wherein:

said heat exchanger means comprises a plurality of axially stacked layers of coils of tubular elements, each said layer including radially outer and inner coils respectively interconnected for passage of said heat transporting fluid through said tubular elements;

said flow path extends from said inlet to said outlet radially outwardly through said heat exchanger means for directing air along said flow path;

said injecting means comprises a plurality of parallel pipes arranged in a ring radially inwardly of said inner coils for directing said spray at said tubes; and said heat exchanger means includes a coil inlet connected to said outer coils and a coil outlet connected to said inner coils.

* * * * *